US012633290B2

(12) United States Patent
Tiwari et al.

(10) Patent No.: US 12,633,290 B2
(45) Date of Patent: May 19, 2026

(54) DOMAIN AND USER INTENT SPECIFIC DISAMBIGUATION OF TRANSCRIBED SPEECH

(71) Applicant: Disney Enterprises, Inc., Burbank, CA (US)

(72) Inventors: Sanchita Tiwari, Cumming, GA (US); Xiuyang Yu, Unionville, CT (US); Justin Ali Kennedy, Norwell, MA (US); Dirk Van Dall, Shelter Island, NY (US)

(73) Assignee: Disney Enterprises, Inc., Burbank, CA (US)

( * ) Notice: Subject to any disclaimer, the term of this patent is extended or adjusted under 35 U.S.C. 154(b) by 340 days.

(21) Appl. No.: 17/666,286

(22) Filed: Feb. 7, 2022

(65) Prior Publication Data

US 2023/0252994 A1 Aug. 10, 2023

(51) Int. Cl.

| | |
|---|---|
| ***G10L 15/26*** | (2006.01) |
| ***G06F 40/279*** | (2020.01) |
| ***G06N 20/00*** | (2019.01) |
| ***G10L 15/02*** | (2006.01) |

(52) U.S. Cl.

CPC ............ *G10L 15/26* (2013.01); *G06F 40/279* (2020.01); *G06N 20/00* (2019.01); *G10L 15/02* (2013.01); *G10L 2015/025* (2013.01)

(58) Field of Classification Search

CPC ... G10L 15/26; G10L 15/02; G10L 2015/025; G10L 15/1815; G06F 40/279; G06N 20/00

See application file for complete search history.

(56) References Cited

U.S. PATENT DOCUMENTS

| | | | | |
|---|---|---|---|---|
| 10,607,601 | B2 * | 3/2020 | Jin | G10L 15/12 |
| 11,211,058 | B1 * | 12/2021 | Eakin | G10L 15/197 |
| 11,295,730 | B1 * | 4/2022 | Mohajer | G10L 15/1822 |
| 11,482,213 | B2 * | 10/2022 | Raghunathan | G10L 15/32 |
| 2021/0142789 | A1 * | 5/2021 | Gurbani | G10L 15/16 |

(Continued)

OTHER PUBLICATIONS

Viana-Cámara, et al. "Evolutionary optimization of contexts for phonetic correction in speech recognition systems." (Year: 2021).*

(Continued)

*Primary Examiner* — Bhavesh M Mehta
*Assistant Examiner* — Nandini Subramani
(74) *Attorney, Agent, or Firm* — Farjami & Farjami LLP

(57) ABSTRACT

A system includes a computing platform including processing hardware and a system memory storing software code. The processing hardware executes the software code to receive a transcript of speech by a user, generate a phoneme stream corresponding to the transcript, partition the phoneme stream into words, and aggregate subsets of the words to form candidate sentences. The software code is further executed to determine, using one or both of an entity identified in the transcript and a history of the user, one or both of a user intent and a context of the speech by the user, rank the candidate sentences and the transcript based on one or both of the user intent and the context of the speech by the user, and identify, based on the ranking, one of the candidate sentences or the transcript as the best transcription of the speech by the user.

18 Claims, 8 Drawing Sheets

(56) References Cited

U.S. PATENT DOCUMENTS

| | | | | |
|---|---|---|---|---|
| 2021/0383072 | A1* | 12/2021 | Bull | G06F 40/30 |
| 2022/0028396 | A1* | 1/2022 | Li | G10L 25/78 |

OTHER PUBLICATIONS

Müller, Meinard. "Dynamic time warping." Information retrieval for music and motion (2007): 69-84 (Year: 2007).*

Mani, Anirudh; Palaskar, Shruti; Meripo, Nimshi Venkat; Konam, Sandeep; and Metze, Florian "ASR Error Correction and Domain Adaptation Using Machine Translation" 2020 IEEE International Conference on Acoustics, Speech and Signal Processing (ICASSP) Mar. 13, 2020 pp. 1-5.

Samarakoon, Lahiru; Mak, Brian; Lam, Albert "Domain Adaptation of End-to-End Speech Recognition in Low-Resource Settings" 2018 IEEE Spoken Language Technology Workshop (SLT) Dec. 2018 pp. 2-8.

Hsu, Wei-Ning; Zhang, Yu; Glass, James "Unsupervised Domain Adaptation for Robust Speech Recognition via Vibrational Autoencoder-Based Data Augmentation" 2017 IEEE Automatic Speech Recognition and Understanding Workshop (ASRU) Dec. 2017 pp. 16-23.

* cited by examiner

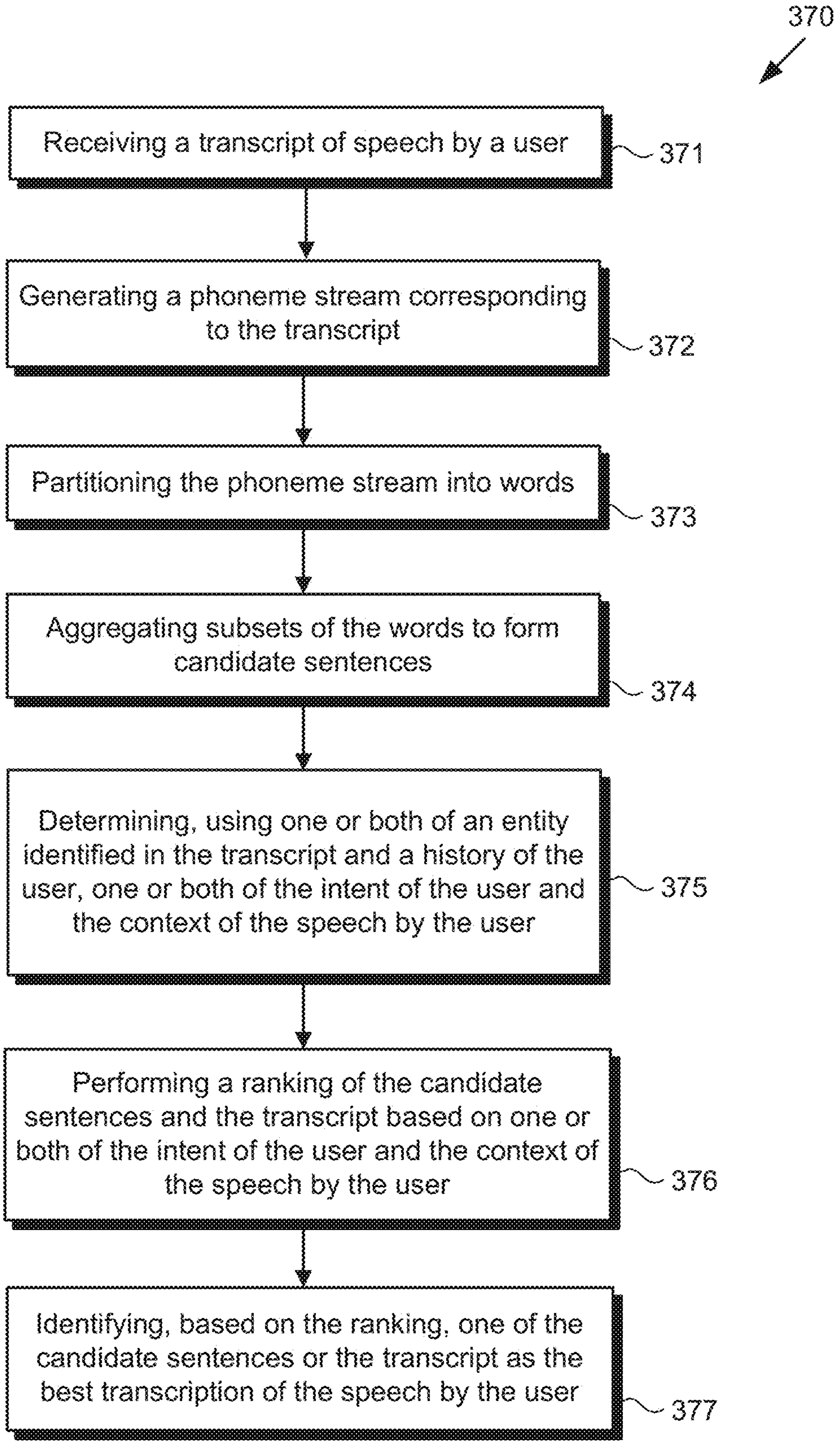

Receiving a transcript of speech by a user ~371

Generating a phoneme stream corresponding to the transcript ~372

Partitioning the phoneme stream into words ~373

Aggregating subsets of the words to form candidate sentences ~374

Determining, using one or both of an entity identified in the transcript and a history of the user, one or both of the intent of the user and the context of the speech by the user ~375

Performing a ranking of the candidate sentences and the transcript based on one or both of the intent of the user and the context of the speech by the user ~376

Identifying, based on the ranking, one of the candidate sentences or the transcript as the best transcription of the speech by the user ~377

DOMAIN AND USER INTENT SPECIFIC DISAMBIGUATION OF TRANSCRIBED SPEECH

BACKGROUND

Most modern automatic speech recognition (ASR) systems are capable of high quality performance under ideal conditions, such as low background noise and clearly enunciated, unaccented human speech. However, interpretive errors can occur when ASR systems are used in noisy environments, or when speech is indistinctly uttered due to age or disability, is heavily accented, is of a different vernacular, or includes linguistic mistakes. Moreover, the reliability of ASR systems can also rely on the corpus of words used to train the system. Consequently, an ASR system trained on a corpus of common language terms may be unreliable when used to transcribe speech that is unique to or characteristic of a specialized language domain, such as medical or other scientific terminology, for example. Consequently, there remains a need in the art for a natural language understanding (NLU) solution capable of performing domain and user intent specific disambiguation of transcribed speech.

BRIEF DESCRIPTION OF THE DRAWINGS

FIG. 3 shows a flowchart presenting an exemplary method for performing domain and user intent specific disambiguation of transcribed speech, according to one implementation;

DETAILED DESCRIPTION

Figure 1:
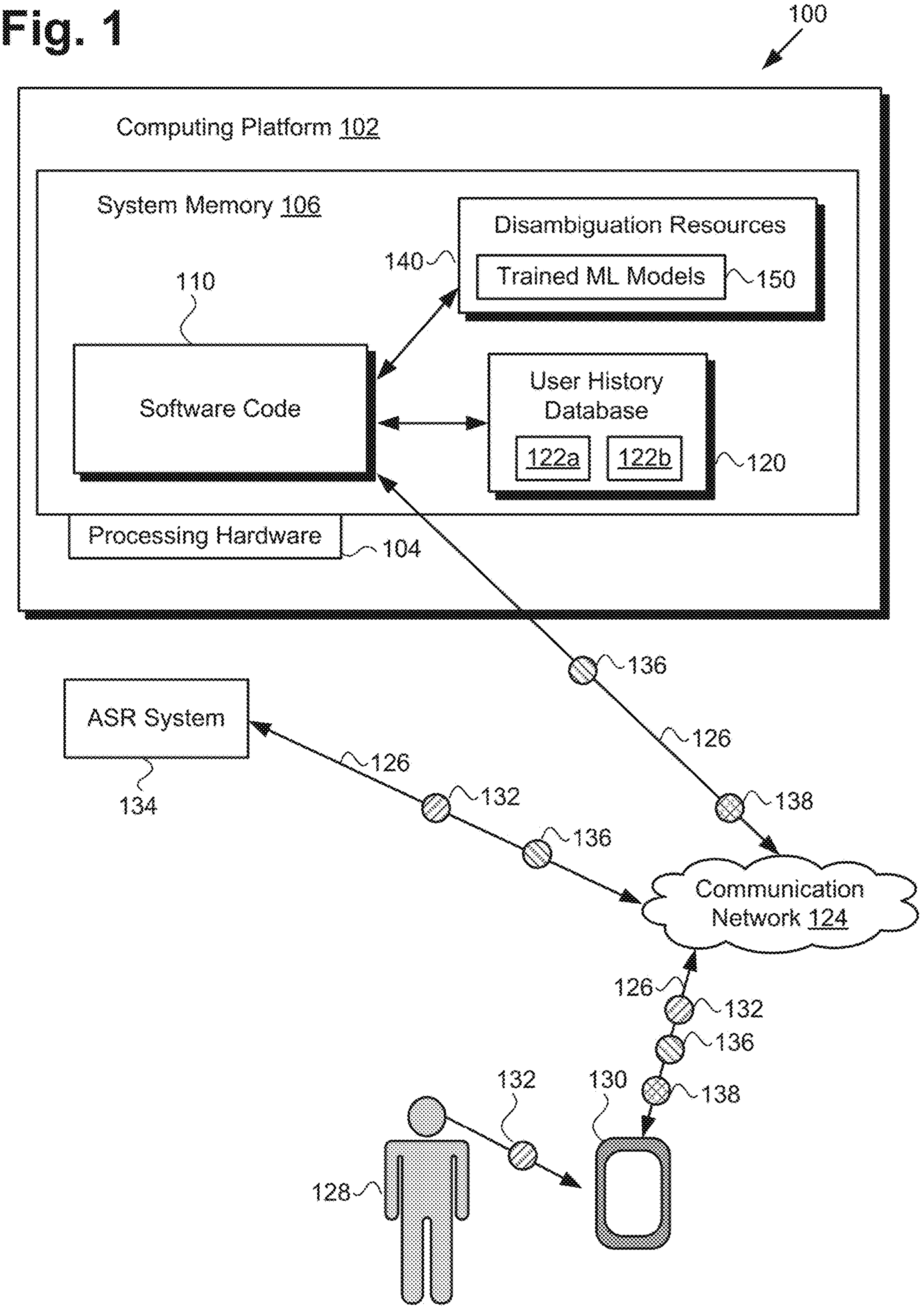
FIG. 1 shows a diagram of a system for performing domain and user intent specific disambiguation of transcribed speech, according to one exemplary implementation.

The following description contains specific information pertaining to implementations in the present disclosure. One skilled in the art will recognize that the present disclosure be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, although most modern automatic speech recognition (ASR) systems are capable of high quality performance under ideal conditions, such as low background noise and clearly enunciated, unaccented human speech, interpretive errors can occur when ASR systems are used in noisy environments, or when speech is indistinctly uttered due to age or disability, is heavily accented, is of a different vernacular, or includes linguistic mistakes. Moreover and as further stated above, the reliability of ASR systems can also rely on the corpus of words used to train the system. Consequently, an ASR system trained on a corpus of common language terms may be unreliable when used to transcribe speech that is unique to or characteristic of a specialized language domain, such as medical or other scientific terminology, by way of example. Consequently, there remains a need in the art for a natural language understanding (NLU) solution capable of performing domain and user intent specific disambiguation of transcribed speech.

The present application is directed to automated systems and methods for performing domain and user intent specific disambiguation of transcribed speech. The disambiguation solution disclosed in the present application reverses the language that is output in transcript form by a conventional ASR system in real-time, while retaining the phonetic hints and context from the transcript, and then superimposes domain and application specific language with the context to disambiguate and correct the transcribed text for a specific domain. The solution disclosed in the present application results in significant improvements in disambiguating domain specific language from common language, thereby advantageously providing improved understanding in situations where audio quality is poor, speech is uttered by non-native speakers, children, the aged, or those with speech disorders, or where confusion can arise due to the unique or distinctive requirements of a particular domain specific vocabulary.

It is noted that the disambiguation solution disclosed herein has a wide variety of practical applications (hereinafter also "use cases") in which a user issues voice commands. Such use cases can include browsing for or selecting media content in the form of movies, television (TV) programming content, music, video games, and the like, for example. Other examples of use cases for the present novel and inventive concepts include retail shopping, food ordering, obtaining travel directions, and communicating with a doctor or first responder, to name merely a few.

As defined in the present application, the term "intent" refers to a goal oriented psychological state of a human user. Examples of the types of goals determining intent include the acquisition of information, acquisition of a product or service, arrival at a particular destination, or viewing or participating in an event, to name a few. Furthermore, because it is not possible to have definite knowledge of a human user's inner mental state, as used in the present application the term "intent" is to be interpreted as "inferred intent." Thus, as used herein, the "intent of the user" refers to the "inferred intent of the user."

In addition, as defined in the present application, the term "domain" refers to an area of specialization such as medicine, the sciences, specific types of entertainment, sports, and specialized pastimes, for example. Thus, the expression "domain-specific language" refers to language that includes words that are unique or characteristic to a particular domain. By contrast "common language" refers to the words and their meanings included in a generic or general purpose dictionary.

In addition, as defined in the present application, the terms "automation," "automated," and "automating" refer to systems and processes that do not require human intervention.

Although in some implementations a human editor or system administrator may review the "best transcription" of speech by a user identified by the systems and using the methods described herein, that human involvement is optional. Thus, the methods described in the present application may be performed under the control of hardware processing components of the disclosed automated systems.

Moreover, as defined in the present application, the expression "machine learning model" or "ML model" may refer to a mathematical model for raking future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, ML models may be trained as classifiers and may be utilized to perform image processing, audio processing, or natural-language processing.

FIG. 1 shows a diagram of system 100 for performing domain and user intent specific disambiguation of transcribed speech, according to one exemplary implementation. As shown in FIG. 1, system 100 includes computing platform 102 having processing hardware 104 and system memory 106 implemented as a computer-readable non-transitory storage medium. According to the present exemplary implementation, system memory 106 stores software code 110, user history database 120 including histories 122*a* and 122*b* of individual users, and one or more disambiguation resources 140 (hereinafter "disambiguation resource(s) 140") including one or more trained machine learning (ML) models 150 (hereinafter "trained ML model(s) 150").

Figure 4A:
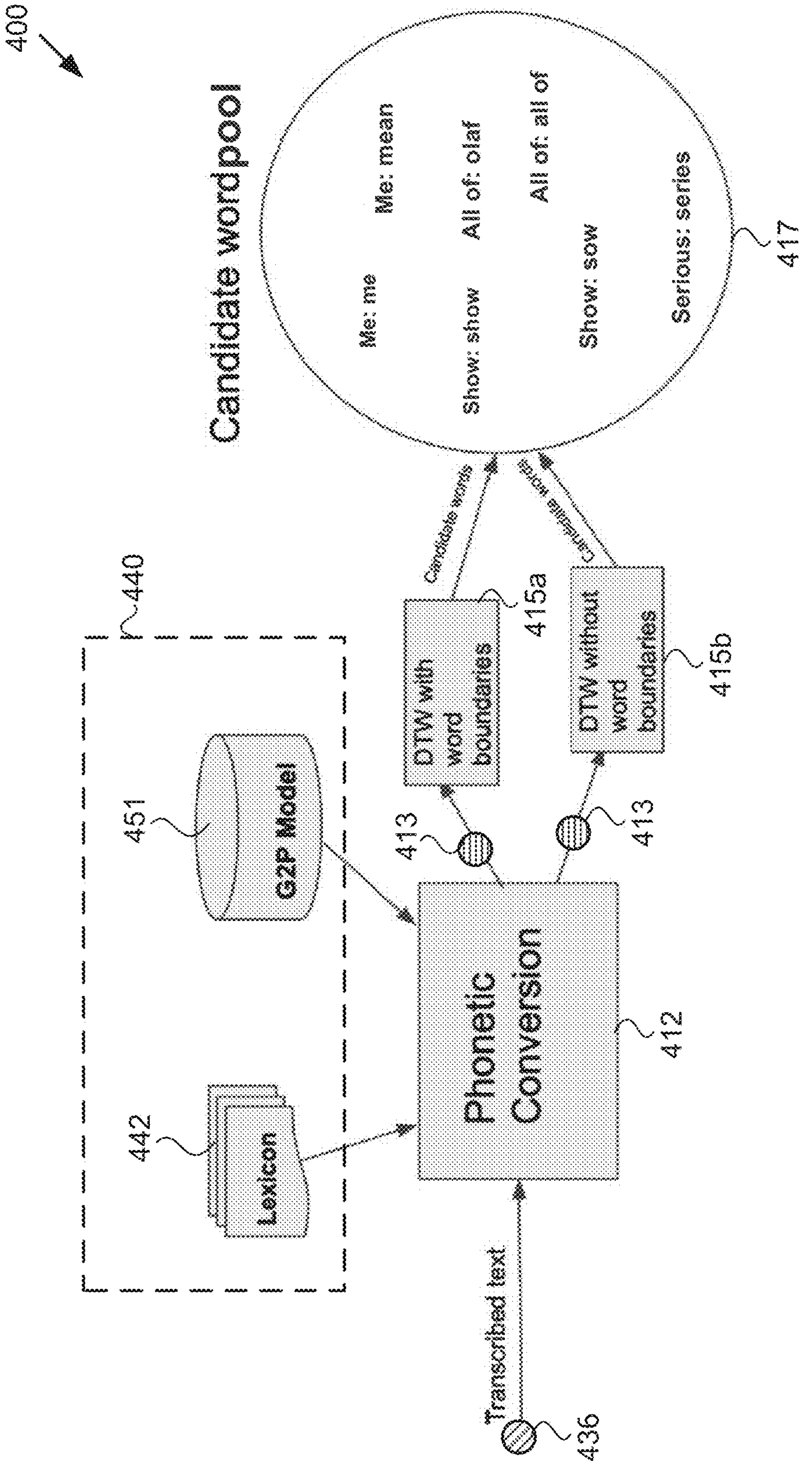
FIG. 4A shows a diagram depicting the functionality of the phonetic conversion module of the software code of FIG. 2, according to one implementation.
Figure 5:
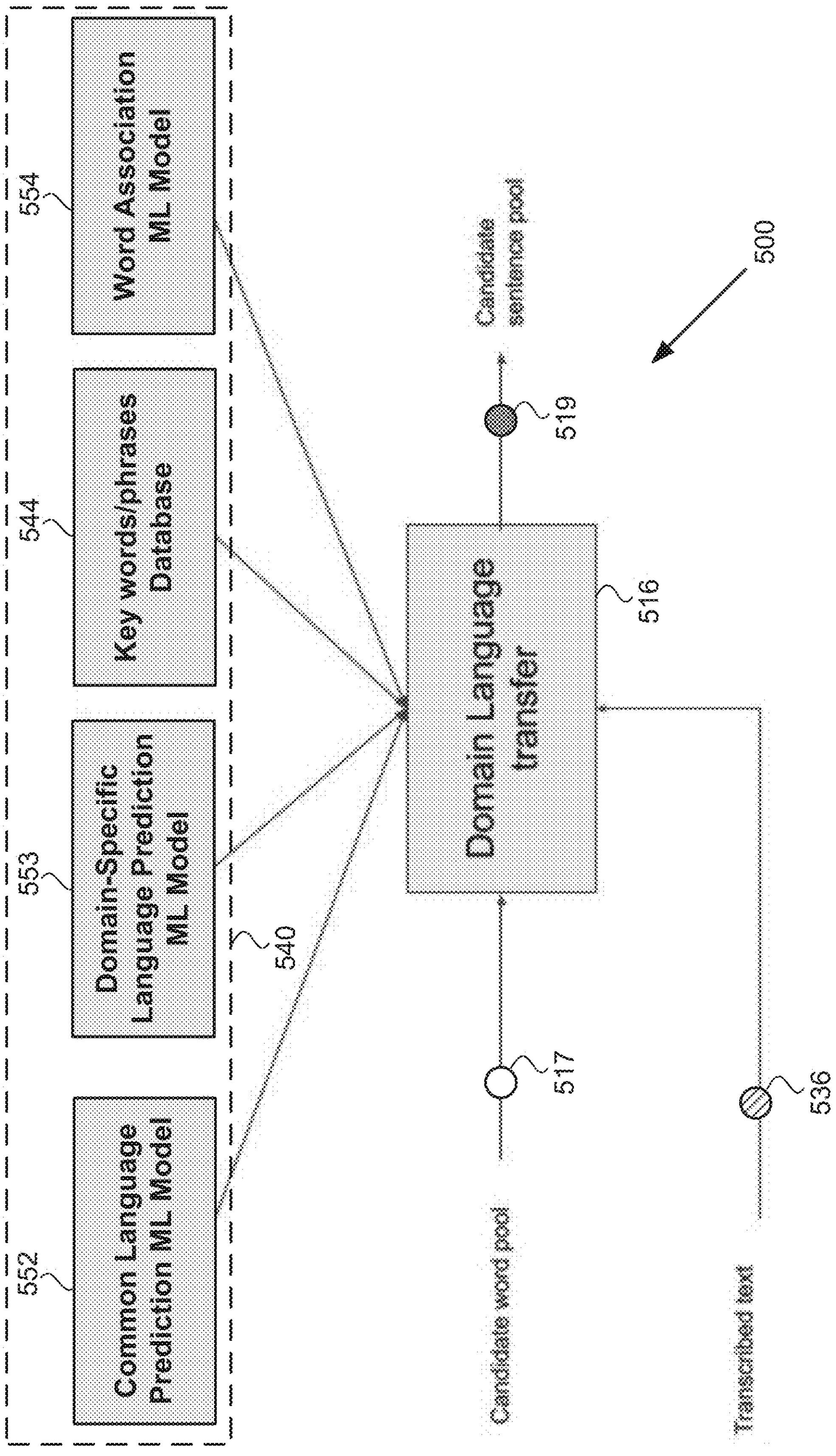
FIG. 5 shows a diagram depicting the functionality of the domain language transfer module of the software code of FIG. 2, according to one implementation.

It is noted that, as shown by FIGS. 4A and 5, disambiguation resources 440 and 540 corresponding in general to disambiguation resources 140 may include features including lexicon 442, trained grapheme-to-phoneme (G2P) ML model 451, trained common language prediction ML model 552, trained domain-specific language prediction ML model 553, key words/phrases database 544, and trained word association ML model 554, as discussed below. It is also noted that lexicon 442 may take the form of a file that includes mappings from words to their respective pronunciations and can be used to provide a key-value pairing, such as a dictionary would. By way merely of example, the lexicon 442 may include an entry linking the word "odd" to the phoneme stream or sequence "AA D," and the word "at" to the phoneme stream or sequence "AE T."

As further shown in FIG. 1, system 100 is implemented within a use environment including communication network 124, ASR system 134, and user system 130. In addition, FIG. 1 shows user 128 of user system 130, speech 132 uttered by user 128, transcript 136 of speech 132, produced by user system 130 or ASR system 134, and best transcription 138 of speech 132, identified by system 100. Also shown in FIG. 1 are network communication links 126 of communication network 124 interactively connecting system 100 with user system 130 and ASR system 134.

It is noted that, in some implementations, disambiguation resource(s) 140 including trained ML model(s) 150 may be incorporated into software code 110 as features of software code 110. That is to say, in some implementations, any or all of the functionality attributed to disambiguation resource(s) 140 by the present disclosure may be attributed to software code 110 alone. It is further noted that although in some implementations, ASR system 134 may be a third party resource and not a feature of system 100 in other implementations, ASR system 134 may be part of system 100, and may be stored in system memory 106.

It is also noted that, in some implementations, as shown in FIG. 1, user history database 120 may be stored in system memory 106. However, in other implementations, user history database 120 may not be a component of system 100, but may be remotely accessible to system 100 via communication network 124 and network communication links 126. Moreover, although FIG. 1 shows user history database 120 as storing two histories 122*a* and 122*b*, that exemplary depiction is also provided merely in the interests of conceptual clarity. More generally, user history database 120 may store more than two histories, such as hundreds, thousands, car millions of histories, for example. Furthermore, each of histories 122*a* and 122*b* may be a history dedicated to a particular user, such as user 128.

Although the present application refers to software code 110, user history database 120, and disambiguation resource (s) 140 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110, user history database 120, and disambiguation resource(s) 140 as being co-located in system memory 106 that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may be implemented virtually, such as in a data center. For example, in some implementations, system 100 may be implemented in software, or as virtual machines.

Although user system 130 is shown as a smartphone or tablet computer in FIG. 1, that representation is also provided merely as an example. More generally, user system 130 may be any suitable mobile or stationary computing device or system that implements data processing capabilities sufficient to receive voice commands, support connections to communication network 124, and implement the functionality ascribed to user system 130 herein. For example, in other implementations, user system 130 may take the form of a desktop computer, laptop computer, smart TV, game platform, or smart wearable device, such as a smartwatch, for example.

Figure 2:
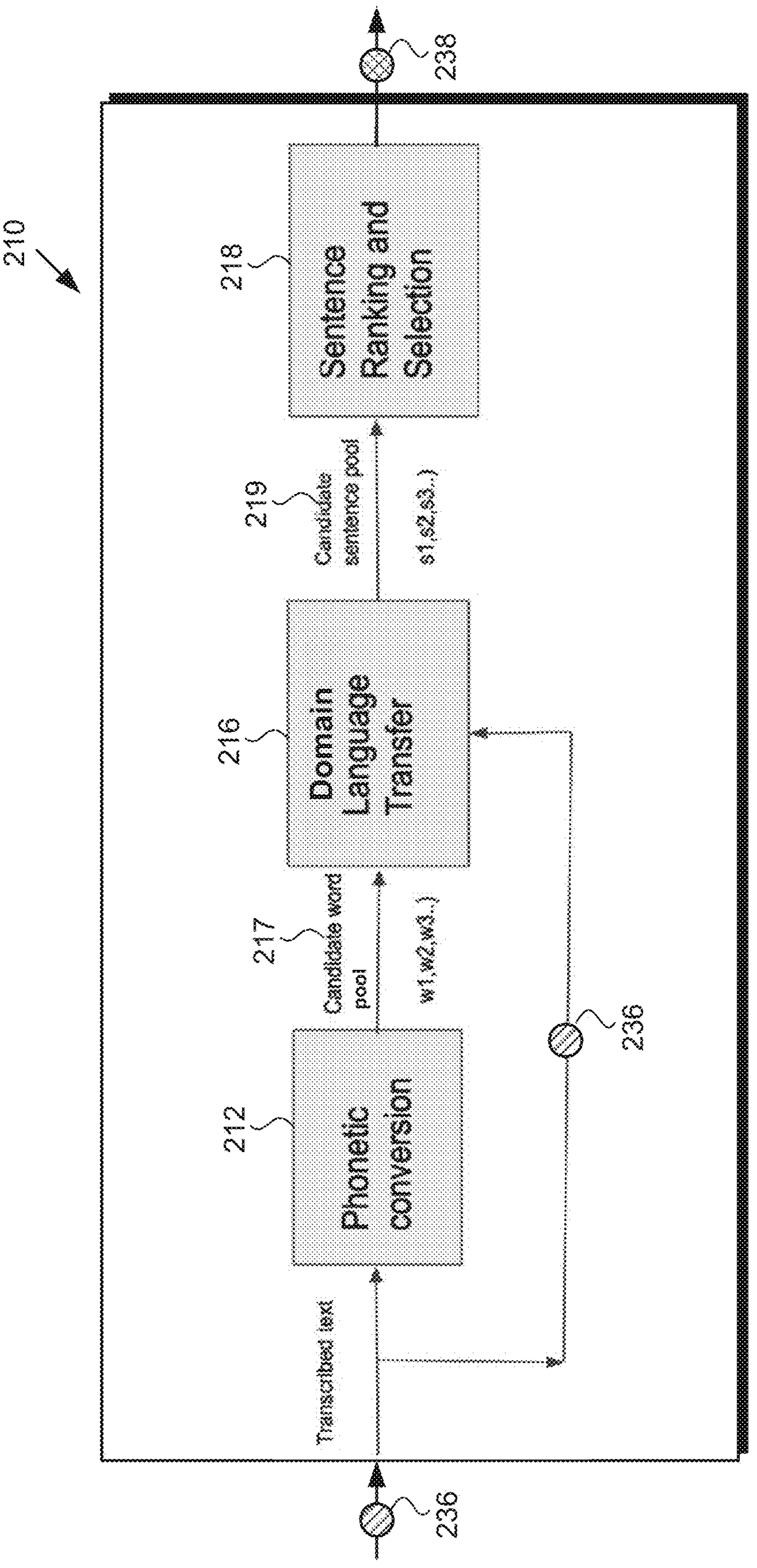
FIG. 2 shows a conceptual block diagram of a software code suitable for use by the system of FIG. 1, according to one implementation.

FIG. 2 shows a conceptual block diagram of software code 210 suitable for use by system 100, in FIG. 1, according to one implementation. As shown in FIG. 2, software code 210 is configured to receive transcript 236 as an input, and to provide best transcription 238 of the speech transcribed in transcript 236 as an output. As further shown in FIG. 2, software code 210 includes phonetic conversion module 212 receiving transcript 236 and producing candidate word pool 217 domain language transfer module 216 receiving candidate word pool 217, as well as transcript 236, and producing candidate sentence pool 219, and sentence ranking and selection module 218 receiving candidate sentence pool 219 and providing best transcription 238.

The specific actions performed by phonetic conversion module 212, domain language transfer module 216 and sentence ranking and selection module 218 will be discussed in detail below by reference to FIGS. 4A, 4B, 5, and 6 in combination with FIG. 3. It is noted that software code 210 corresponds in general to software code 110, in FIG. 1, and those corresponding features may share any of the characteristics attributed to either corresponding feature by the present disclosure. Thus, although not shown in FIG. 1, software code 110 may include features corresponding respectively to phonetic conversion module 212, domain language transfer module 216, and sentence ranking and selection module 218.

The operation of system 100 including software code 110/210 will be further described by reference to FIG. 3. FIG. 3 shows flowchart 370 presenting an exemplary method for performing domain and user intent specific disambiguation of transcribed speech, according to one implementation. With respect to the actions outlined in FIG. 3, it is noted that certain details and features have been left out of flowchart 370 in order not to obscure the discussion of the inventive features in the present application.

Referring to FIG. 3 in combination with FIGS. 1 and 2 flowchart 370 begins with receiving transcript 136/236 of speech 132 by user 128 (action 371). It is contemplated that speech 132 by user 128 and transcript 136/236 of speech 132 will take the form of a single sentence in the form of a question or request, although in some use cases, speech 132 and transcript 136/236 may include multiple sentences. In some use cases, transcript 136/236 of speech 132 by user 128 may be produced by ASR system 134 using speech 132 transmitted to ASR system 134 by user system 130. However, in other use cases, transcript 136/236 of speech 132 by user 128 may be produced by client system 130. As shown by FIG. 1, transcript 136/236 may be received by system 100 from user system 130 or ASR system 134 via communication network 124 and network communication links 126. As further shown by FIG. 2, transcript 136/236 may be received in action 371 by software code 110/210, executed by processing hardware 104 of computing platform 102.

Flowchart 370 further includes generating a phoneme stream corresponding to transcript 136/236 (action 372). Generation of the phoneme stream corresponding to transcript 136/236 in action 372 may be performed by software code 110/210, executed by processing hardware 104 of computing platform 102, and using phonetic conversion module 212, as described below.

Referring to FIG. 4A, FIG. 4A shows diagram 400 depicting the functionality of phonetic conversion module 412, according to one implementation. In addition to phonetic conversion module 412, diagram 400 shows transcript 436, disambiguation resources 440 including lexicon 442 and trained G2P ML model 451, and candidate word pool 417. Also depicted by diagram 400 are dynamic time warping (DTW) processes 415*a* and 415*b* performed by phonetic conversion module 412. It is noted that, as known in the art, DTW is a technique that compares temporal sequences of signals that do not perfectly match in order to find the optimal match between the sequences.

As shown in FIG. 4A, phonetic conversion module 412 is configured to receive transcript 436, to generate phoneme stream 413 corresponding to transcript 436 using lexicon 442 and trained G2P ML model 451, and to produce candidate word pool 417 using phoneme stream 413. Trained G2P ML model 451 may be implemented using a recurrent neural network (RNN), such as a long short-term memory (LSTM) encoder-decoder architecture, or using Transformers.

It is further noted that phonetic conversion module 412 and candidate word pool 417 correspond respectively in general to phonetic conversion module 212 and candidate word pool 217, in FIG. 2. Consequently, phonetic conversion module 212 and candidate word pool 217 may share any of the characteristics attributed to respective phonetic conversion module 412 and candidate word pool 417 by the present disclosure, and vice versa. In addition, transcript 436, in FIG. 4A, corresponds in general to transcript 136/236 in FIGS. 1 and 2. Thus transcript 436 may share any of the characteristics attributed to transcript 136/236 by the present, disclosure, and vice versa. Moreover, disambiguation resources 440 correspond in general to disambiguation resource(s) 140, in FIG. 1. Consequently, disambiguation resource(s) 140 may share any of the characteristics attributed to disambiguation resources 440 by the present disclosure, and vice versa. That is to say like disambiguation resources 440, disambiguation resource(s) 140 may include features corresponding respectively to lexicon 442 and trained G2P ML model 451.

Regarding lexicon 442, it is noted that lexicon 442 may include multiple different lexicons, including one or more common language lexicons and one or more domain-specific lexicons specific to the application or use case that system 100 is configured to support.

Because transcript 136/236/436 includes transcribed text but no acoustic information of what user 128 uttered as speech 132, action 372 converts the transcribed text back into a stream of phonemes. A phoneme, as known in the art, is a distinct unit of sound. A "stream of phonemes" may refer to a sequence of individual phonemes, i.e., a sequence of distinct sounds. To obtain a better understanding of the possible domain-specific word confusions, phoneme stream 413 is analyzed with word boundaries obtained from transcript 136/236/436, as well as without such boundaries to identify unigram and n-gram level confusions using DTW, which, as noted above is a technique that compares temporal sequences of signals that do not perfectly match in order to find the optimal match between the sequences, as described below by reference to action 373 and FIG. 4B.

Referring once again to FIG. 3 in combination with FIGS. 1, 2, and 4A, flowchart 370 further includes partitioning phoneme stream 413 into words (action 373). Once transcript 136/236/436 is converted into phoneme stream 413 in action 372, sequences from phoneme stream 413 may be matched to words included in lexicon 442. As noted above, lexicon 442 may include one or more lexicons of common language words, as well as one or more lexicons of domain-specific words. It is noted that trained G2P ML model 451 can be trained using lexicon 442 to predict the pronunciation for domain-specific words for which the pronunciation would otherwise be unknown.

As stated above, the partitioning of phoneme sequences from phoneme stream 136/236/436 into words may be performed in one or both of two different ways: 1) with word boundaries, and 2) without word boundaries.

1) With Word Boundaries (One-to-One Matching):

Comparisons of bounded phoneme sequences with words can result in multiple different unigram variations that could represent words included in speech 132 by user 128. For example, processing hardware 104 may execute software code 110/210 to partition phoneme stream 413 into words using word boundaries obtained from transcript 136/236/436. Similarity metric such as cosine similarity or Euclidean distance can be used to find other confusing words.

Example: "show me all series"

"Show" may be "show" or "sow"

"Me" may be "me" or "mean

"All" may be "all" or "oil"

"Series" may be "series" or "serious"

2) Without Word Boundaries (Many-To-Many Matching):

This type of comparison snakes the search of possible spoken words more elastic by removing the word boundaries and allowing phoneme stream 413 to be partitioned into multiple words, or to merge multiple words into a single word to find potential candidates words.

Example: the two words "all of" may be merged to form the single proper noun "Olaf."

Figure 4B:
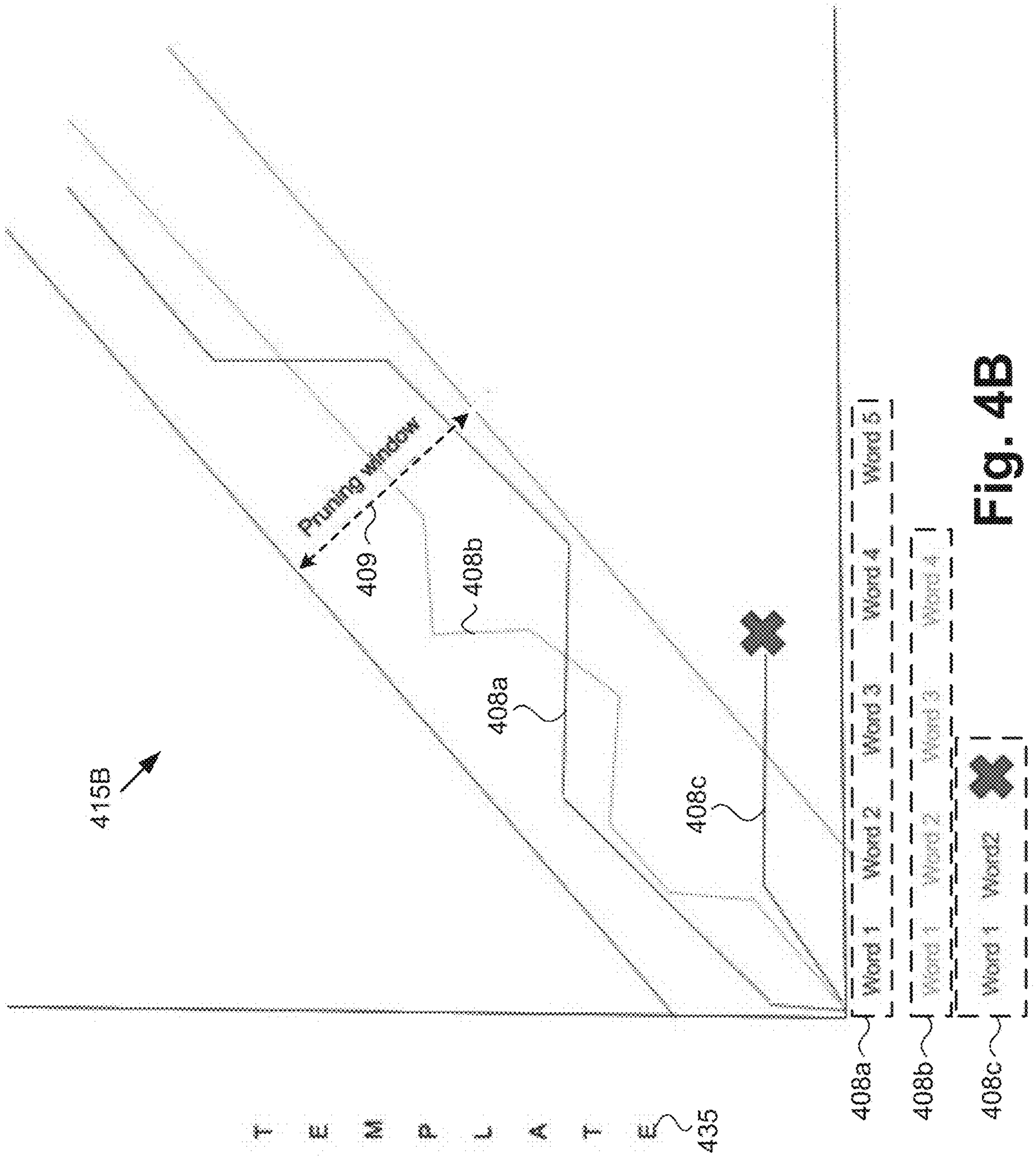
FIG. 4B shows a diagram depicting a Dynamic Time Warping (DTW) technique employed by the phonetic conversion module of FIG. 4A, according to one implementation.

DTW can be used to find a predetermined integer number "n" best or most plausible word sequences through the application of pruning to avoid the computational burden of calculating similarity metrics for phoneme sequences that appear implausible. FIG. 4B shows diagram 415B depicting a DTW technique employed by phonetic conversion module 212/412, according to one implementation, to prune word sequences from words matched using either of the approaches described above, i.e., with or without word boundaries.

As shown in FIG. 4B, diagram 415B includes a plot of different word sequences 408*a*, 408*b*, and 408*c* when compared with template 435, which may be transcript 136/236/436, for example. Also shown in FIG. 4B is pruning window 409 used to distinguish between sequences of words that are plausibly related one another and to template 435. It is noted that word sequences 408*a*, 408*b*, 408*c* are not candidate sentences, but are rather used to decide which words are suitably plausible for inclusion in candidate word pool 417, in FIG. 4A. For example, word sequences may initially be produced randomly, and pruning window 409 may be relied upon to prevent sequences of words that diverge significantly from template 435 from being included in candidate word pool 417. As a specific but non-limiting example, consider using the word sequence "how are you" as template 435 and comparing that to a word sequence beginning with "I am." The rapid divergence of "I am" from "how are you" will cause pruning window 409 to identify "I am" as a rejected word sequence. Eventually the sequences of words that remain within the confines of pruning window 409 will give the variations that are close to the actual sentence to be considered for further processing.

According to the example shown in FIG. 4B, word sequence 408*c* diverges from pruning window 409 within three words, while word sequences 408*a* and 408*b* include respective strings of multiple words that remain within pruning window. As a result, the combinations of words included in respective word sequences 408*a* and 408*b* may be included in candidate word pool 417, while the combination of words in word sequence 408*c* may be omitted from candidate word pool 417. However, although the combination of words forming word sequence 408*c* is excluded from candidate work pool 417, individual words from word sequence 408*c* may yet qualify to be included in candidate word pool 417 when they can successfully be combined with other words to form a word sequence that remains within pruning window 409.

Flowchart 370 further includes aggregating subsets of the words resulting from the partitioning performed in action 373 to form multiple candidate sentences (action 374). Aggregation of subsets of words included in candidate word pool 417, in FIG. 4A, to form candidate sentences in action 374 may be performed by software code 110/210, executed by processing hardware 104 of computing platform 102, and using domain language transfer module 216, as described below.

Referring to FIG. 5. FIG. 5 shows diagram 500 depicting the functionality of domain language transfer module 516, according to one implementation. In addition to domain language transfer module 516, diagram 500 shows disambiguation resources 540 including trained common language prediction ML model 552, trained domain-specific language prediction ML model 553, key words/phrases database 544, and trained word association ML model 554. Also depicted by diagram 500 are transcript 536, candidate word pool 517, and candidate sentence pool 519. As shown in FIG. 5, domain language transfer module 516 is configured to receive transcript 536 and candidate word pool 517, and to produce candidate sentence pool 419 using candidate word pool 517, transcript 536, and disambiguation resources 540.

It is noted that domain language transfer module 516 and candidate sentence pool 519 correspond respectively in general to domain language transfer module 216 and candidate sentence pool 219, in FIG. 2. Consequently, domain language transfer module 216 and candidate sentence pool 219 may share any of the characteristics attributed to respective domain language transfer module 516 and candidate sentence pool 519 by the present disclosure, and vice versa. In addition, candidate word pool 517 corresponds in general to candidate word pool 217/417 in FIGS. 2 and 4A, and those corresponding features may share the characteristics attributed to any one of those corresponding features.

Transcript 536 corresponds in general to transcript 136/236/436 in FIGS. 1, 2, and 4A. Thus transcript 536 may share any of the characteristics attributed to transcript 136/236/436 by the present disclosure, and vice versa. Moreover, disambiguation resources 540 correspond in general to disambiguation resource(s) 140, in FIG. 1. Consequently, disambiguation resource(s) 140 may share any of the characteristics attributed to disambiguation resources 540 by the present disclosure, and vice versa. That is to say like disambiguation resources 540, disambiguation resource(s) 140 may include features corresponding respectively to trained common language prediction ML model 552, trained domain-specific language prediction ML model 553, key words/phrases database 544, and trained word association ML model 554.

Action 374 includes reconstructing sentences from words included in candidate word pool 217/417/517. Initially, all, or substantially all permutations of words included in candidate word pool 217/417/517 may be evaluated. For example, a weighted combination of trained common language prediction ML model 552, trained domain-specific language prediction ML model 553 may be used to disambiguate and correct the transcribed text included in transcript 136/236/436/536. Trained common language prediction ML model 552 may be used in order to compensate for what might by a limited domain-specific vocabulary and insufficient domain-specific training data. In some implementations, trained common language prediction ML model 552 may take the form of any readily available language models, such as Bidirectional Encoder Representations from Transformers (BERT), a generalized autoregressive model trained on a large corpus using the permutation language modeling objective, such as XLNet, or any bidirectional language model for effectively using bidirectional content information to model or analyze content based on corrupted input.

Trained domain-specific language prediction ML model 553 may be trained by fine-turning an available pre-trained model, such as XLNet. The objective is to maximize the expected log likelihood of a sequence of words by responding to all possible permutations of the factorization order. In use cases in which system 100 is configured to support searches or queries from user 128 regarding the availability of media content such as movies, TV programming, or video games, for example, domain-specific language data may include titles, characters, actors, synopses, subtitles, reviews, content metadata, and the like.

In addition to using the weighted language models, i.e., trained common language prediction ML model 552, trained domain-specific language prediction ML model 553, word associations may also be considered during the disambiguating and correcting process. Trained word association ML model 554 may be built on the domain-specific language database that contains the associations and dependencies between words as well as implicit associations or co-references such as co-occurrence events. Let $R(x_i, x_j)$ be the association between word $x_i$ and word $x_j$:

$$R(x_i, x_j) = \begin{cases} 1 & \text{association exists} \\ 0 & \text{no association} \end{cases}$$

Trained word association ML model 554 mainly provides an indication of the existence of association between two words and the group of words that have associations with a given word. A word association score $R_a$ of a length-T word sequence $X=[x_1, \ldots, x_T]$ may be defined as:

$$R_a(X) = \frac{1}{2T}\sum_{i=1}^{T}\sum_{j=1,\neq i}^{T} R(x_i, x_j)$$

In addition to using trained common language prediction ML model 552, trained domain-specific language prediction ML model 553, and trained word association ML model 554, in some implementations it, may also be advantageous to increase the number of domain-specific key word appearances in candidate sentence pool 219/519 by adding key word weights ($w_k$) during the domain language transfer process. The key word score K of a length-T word sequence $X=[x_1, \ldots, x_T]$ may be defined as:

$$K(X) = \frac{1}{T}N(x \in K_t)$$

where $N(x \in K_t)$ is the number of words that are key words.

Confidence Scoring

A hypothesized sentence for inclusion in candidate sentence pool 519/519 may be generated using candidate word pool 217/417/517. That is to say, given a hypothesized sequence $X=[x_1, \ldots, x_T]$ with length T, $Z_T$ denotes the set of all possible permutations of the index sequence [1, . . . , T]. Let $P_{clm}(x_{z_t}|X_{Z<t_t}, \vartheta)$ be the likelihood from trained common language prediction ML model 552 and $P_{dlm}(x_{z_t}|X_{Z<t_t}, \vartheta)$ be the likelihood from trained domain-specific language prediction ML model 553. Action 374 includes maximizing each log-likelihood score LLs, as defined by:

$$LLs := w_c\sum_{t=1}^{T}\log P_{clm}(x_{z_t} \mid X_{Z<t}, \vartheta) + w_d\sum_{t=1}^{T}\log P_{dlm}(x_{z_t} \mid X_{Z<t}, \vartheta) + w_{tam}R_a(X) + w_kK(X)$$

where $w_c$, $w_d$, $w_{tam}$, and $w_k$ are the weights of trained common language prediction ML model 552, trained domain-specific language prediction ML model 553, trained word association ML model 553, and the number of key words present in the hypothesized sentence, respectively. It is noted that weights $w_c$, $w_d$, $w_{tam}$, and $w_k$ can be trained. Based on the LLs, a predetermined integer number "n" of the highest scoring sentences may be selected for inclusion in candidate sentence pool 219/519, under the constraint that every hypothesized sentence included in candidate sentence pool must have an LLs higher than the LLs computed for transcript 136/236/436/536. In other words, in use cases in which transcript 136/236/436/536 contains a single sentence, and less than n hypothesized sentences have a respective LLs higher than the LLs of transcript 136/236/436/536, transcript 136/236/436/536 may be included in candidate sentence pool 219/519.

Thus, aggregating the subsets of words included in candidate word pool 217/417/517 to form the candidate sentences of candidate sentence pool 217/519 in action 374 may include determining a confidence score for each of those candidate sentences. In addition, in some implementations, action 374 may include determining a confidence score for transcript 136/236/436/536. Moreover, the confidence score for each candidate sentence and transcript 136/236/436/536 may be determined based on a weighted sum of a word association score and a keyword score of each of the candidate sentences and 136/236/436/536.

According to some implementations, disambiguation resource(s) 140/540 of system 100 may include trained word association machine ML model 554, in those implementations, the word association score may be determined using trained word association ML model 554. Furthermore, according to some implementations, disambiguation resource(s) 140/540 of system 100 may include one or both of trained common language prediction ML model 552 and trained domain-specific language prediction ML model 553. In those implementations, aggregating the subsets of words to form the candidate sentences in action 374 may be performed using trained common language prediction ML model trained domain-specific language prediction ML model 553, or both, as described above.

Referring once again to FIG. 3, flowchart 370 further includes determining, using at least one of an entity identified in transcript 136/236/436/536 or a history (hereinafter "history 122*a*") of user 128, an intent of user 128, a context of speech 132 by user 128, or both (action 375). It is noted that, as defined for the purposes of the present application, the term "entity" refers to an application or use case specific feature having a distinct identity. For example, in use cases in which user 128 is searching for media content, an "entity" may be a title of a movie, TV show, or video game, or a specific character or actor. Alternatively, in use cases in which user 128 is seeking driving directions, an "entity" may be a landmark or other specifically recognizable location, and so forth. Determining the intent of user 128, the context of speech 132, or both in action 375 may be performed by software code 110/210, executed by processing hardware 104 of computing platform 102, and using sentence ranking and selection module 218 as described below.

Figure 6:
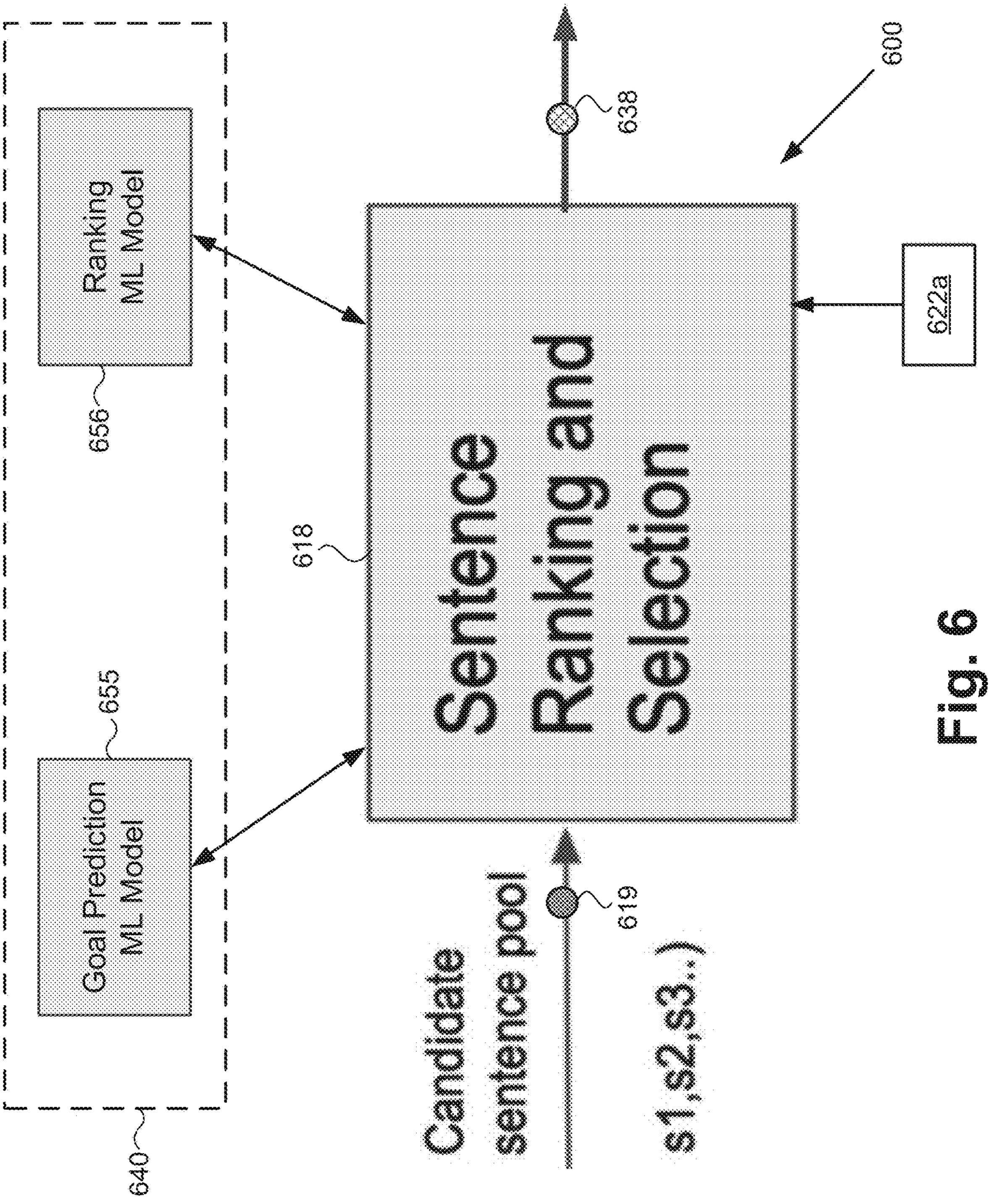
FIG. 6 shows a diagram depicting the functionality of the sentence ranking and selection module of the software code of FIG. 2, according to one implementation.

Referring to FIG. 6, FIG. 6 shows diagram 600 depicting the functionality of sentence ranking and selection module 618, according to one implementation. In addition to sentence ranking and selection module 618, diagram 600 shows disambiguation resources 640 including trained goal prediction ML model 655 and trained ranking ML, model 656. Also depicted by diagram 600 are candidate sentence pool 619, and best transcription 638 of speech 132 by user 128 shown in FIG. 1. According to the exemplary implementation shown in FIG. 6, sentence ranking and selection module 618 is configured to receive candidate sentence pool 619, and to identify best transcription 638 of speech 132 using disambiguation resources 640.

It is noted that sentence ranking and selection module 618 corresponds in general to sentence ranking and selection module 218, in FIG. 2, and those corresponding features may share any of the characteristics attributed to either corresponding feature by the present disclosure. In addition, candidate sentence pool 619 corresponds in general to candidate sentence pool 219/519, in FIGS. 2 and 5. Consequently, candidate sentence pool 619 may share any of the characteristics attributed to candidate sentence pool 519/519 by the present disclosure, and vice versa. Moreover, history 622*a* and best transcription 638, in FIG. 6, correspond respectively in general to history 122*a* in FIG. 1 and best transcription 138/238, in FIGS. 1 and 2. Thus, history 622*a* and best transcription 638 may share any of the characteristics attributed to respective history 122*a* and best transcription 138/238 by the present disclosure, and vice versa.

Furthermore, disambiguation resources 640, in FIG. 6, correspond in general to disambiguation resource(s) 140 in FIG. 1. Consequently, disambiguation resource(s) 140 may share any of the characteristics attributed to disambiguation resources 640 by the present disclosure, and vice versa. That is to say like disambiguation resources 640, disambiguation resource(s) 140 may include features corresponding respectively to trained goal prediction ML model 655 and trained ranking ML model 656.

It is noted that, in action 375, a contribution to the final transcription results based on a particular application or use case is sought. Given sentence candidate pool 219/519/619, the ultimate objective is to rank the candidate sentences based on their likely relevance to the intent of user 128.

For the purposes of the present disambiguation solution, an application or use case can correspond to a set of intents and entities where the recognition of each along with given context can inform the transcription process. In action 375, natural language processing techniques can be used to detect intents and entities in history 122*a*/622*a* of user 128, which may include a dialogue history of user 128. This can be done using trained goal prediction ML model 655 in the form of a multi-task entity and intent recognition based transformer network or similar model trained on textual examples containing the intents and entities of the given use case. Similarly, the intents and entities are detected for the candidate sentences included in candidate sentence pool 219/519/619. Pre-trained dense feature embeddings from BERT, ConveRT, or similar NNs may be used to encode history 122*a*/622*a* of user 128 along with the candidate sentences included in candidate sentence pool 219/519/619 and their associated intents and entities.

Intent classification can be trained using sentence exemplars associated with their ground truth intents, where the examples are encoded by a particular pre-trained embedding. Dot-product loss or another suitable loss can be used to maximize similarity between transformer output and target intent. Standard entity-extraction techniques can include the implementation of a conditional random field (CRF), for example. Such a process can be trained in a multi-task fashion with the intent classification. Thus, action 375 may be perforated by software code 110/210, executed by processing hardware 104 of computing platform 102, and using trained goal prediction ML model 655.

Flowchart 370 further includes performing a ranking of candidate sentences from candidate sentence pool 219/519/619 and transcript 136/236/436/536 based on the intent of user 128, the context of speech 132 by user 128, or both (action 376). In action 376, trained ranking ML model 656 may be implemented as a transformer-based NN optimized for ranking the candidate sentences and transcript 136/236/436/536, and thereby outputting what it predicts to be the most probable, i.e., "best" transcription. This process can be thought of as a constrained variant of the common "text ranking" problem as discussed in the deep learning literature and ongoing research. Typically, text ranking assumes the existence of a corpus of texts $C=\{a_i\}$ which can be structured or unstructured. Given a query q, the task of text ranking is to return a ranked list of n texts $\{X_1, \ldots, X_n\}$ from a finite collection of texts (corpus), that optimizes a metric of interest, such as average precision for example. Unlike use cases such as "search" where the corpus can consist of billions of web pages, here the corpus is limited to the sentences included in candidate sentence pool 219/519/619.

Trained ranking ML model 556 receives as input one or both of the determined intent of user 128 and the encoded context of speech 132 by user 128, as well as the encoded candidate sentences and their associated intents and entities. The output of trained ranking ML model 556 represents a ranked order of how well each candidate sentence 'fits' as the correct transcription. It is noted that, in addition to identifying which sentences are to be included in candidate sentence pool 219/519/619, the confidence scores determined as part of action 374 may also be used in action 376 as an additional basis for ranking the candidate sentences. Action 376 may be performed by software code 110/210, executed by processing hardware 104 of computing platform 102, and using trained ranking ML model 556.

Flowchart 370 further includes identifying, based on the ranking performed in action 376, one of transcript 136/236/436/536 or one of the other candidate sentences included in candidate sentence pool 219/519/619 as best transcription 138/638 of speech 132 by user 128 (action 377). In practical terms, action 377 includes determining which candidate sentence most reasonably follows, given history **122*a*/622*a* of user 128 and what is known about the particular use-case. In this sense, action 377 is an attempt to determine which of the sentences included in candidate sentence pool 219/519/619 continues the flow of conversation best, i.e., which makes the most sense. Action 377 may be performed by software code 110/210 executed by processing hardware 104 of computing platform 102**.

Regarding best transcription 138/638, it is noted that although in some use cases one of the candidate sentences aggregated in action 374 may be identified as best transcription 138/638 in action 377, in other use cases, original transcript 136/236/436/536 received in action 371 may be identified as best transcription 138/638. Thus, in addition to making domain-specific corrections to transcript 136/236/436/536 when necessary, system 100 is also configured to identify transcript 136/236/436/536 as best transcription 138/638 of speech 132 by user 128 when that is appropriate.

According to the exemplary implementation shown in FIG. 1, system 100 may output best transcription 138/638 of speech 132 to user system 130. For example, and as further depicted in FIG. 1, processing hardware 104 of computing platform 102 may execute software code 110/210 to transmit best transcription 138/638 to user system 130 via communication network 124 and network communication links 126.

With respect to the method outlined by flowchart 370, it is emphasized that actions 372, 373, 374, 375, 376, and 377 (hereinafter "actions 372-377") may be performed in real-time relative to receiving transcript 136/236/436/536 in action 371, such as within less than ten seconds of receiving transcript 136/236/436/536, for example. Moreover, actions 371 and 372-377 may advantageously be performed in an automated process from which human involvement may be omitted.

Figure 7:
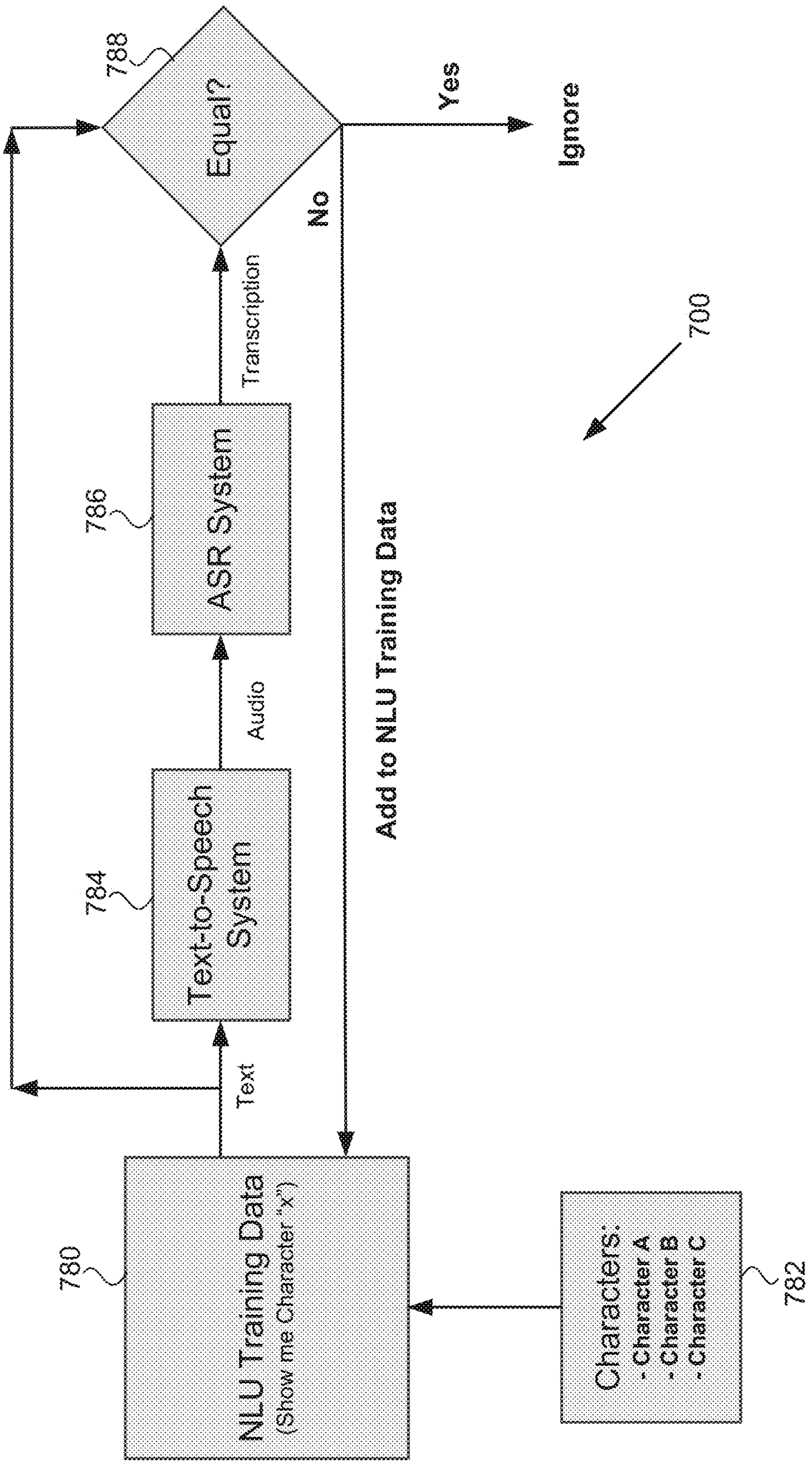
FIG. 7 shows a diagram of an exemplary pipeline for generating candidate sentence variations for the system of FIG. 1, according to one implementation.

FIG. 7 shows diagram 700 of an exemplary pipeline for generating candidate sentence variations, according to one implementation. It is noted that although diagram 700 depicts a use case in which the candidate sentence variations are search requests for media content including a particular character from character database 782, that representation is provided merely as an example. Consequently, a pipeline analogous to that described by reference to diagram 700 could be used to generate candidate sentence variations for other use cases and domains.

According to the exemplary implementation shown in FIG. 7, NLU training data 780 may include the sentence template: "show me character 'x'", where character 'x' is one of Character A, Character B, Character C, or another character identified in character database 782. Once the sentence template is populated, e.g., to read "Show me Character A," that sentence may be provided as an input to Text-To-Speech System 784, which produces audio of the sentence being spoken. That audio is then provided as input to off-the-shelf ASR System 786, which converts the audio into a transcript of the audio. Comparison block 788 compares the transcript produced by ASR System 786 to the original sentence provided as input to Text-To-Speech System 784. When the transcript and original sentence match, the original sentence is not needed as training data and may be discarded. However, when the transcript and original sentence differ the original sentence is potentially a useful domain-specific variation of the transcript produced by off-the-shelf ASR system 786, and as such is added to NLU training data 780. Using the pipeline shown by diagram 700 in the manner described above, a large corpus of domain-specific candidate sentence variations can advantageously be identified and incorporated in to NLU training data 780.

Thus, the present application discloses automated systems and methods for performing domain and user intent specific disambiguation of transcribed speech. As discussed above, the disambiguation solution disclosed in the present application reverses the language that s output in transcript form by a conventional ASR system in real-time, while retaining the phonetic hints and context from the transcript, and then superimposing domain and application specific language along with the context to disambiguate and correct the transcribed text for a specific domain. The solution disclosed in the present application advances the state-of-the-art by providing significant improvements in disambiguating domain specific language from common language, as well as significant improvements in language understanding in situations where audio quality is poor, linguistic errors are present, speech is uttered by non-native speakers, children, the aged, or those with speech disorders, or where confusion can arise due to the unique or distinctive requirements of a particular domain specific vocabulary.

From the above description it is manifest that various techniques can be used to implement the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform including a processing hardware and a system memory storing a software code, a trained common language prediction machine learning (ML) model, a trained domain-specific language prediction ML model, and a trained word association ML model;

the processing hardware configured to execute the software code to:

receive a transcript of speech by a user;

generate a phoneme stream corresponding to the transcript;

partition the phoneme stream into a plurality of words;

randomly generate, using the plurality of words partitioned from the phoneme stream, a plurality of word sequences of variable length;

identify, using dynamic time warping (DTW) applied to the randomly generated word sequences of variable length, a candidate word pool;

designate, using the trained common language prediction ML model, the trained domain-specific language prediction ML model and the trained word association ML model to predict a disambiguation of the transcript and each of a plurality of different sequences of words included in the candidate word pool, a plurality of candidate sentences, wherein designating the plurality of candidate sentences further includes determining a confidence score for the transcript and each of the plurality of candidate sentences;

determine, using at least one of an entity identified in the transcript or a history of the user, at least one of an intent of the user or a context of the speech by the user;

perform a ranking of the plurality of candidate sentences and the transcript based on the at least one of the intent of the user or the context of the speech by the user; and identify, based on the ranking, one of the plurality of candidate sentences or the transcript as a best transcription of the speech by the user.

2. The system of claim 1, wherein the processing hardware is further configured to execute the software code to:

wherein the ranking of the plurality of candidate sentences and the transcript is further based on the confidence score for the transcript and each of the plurality of candidate sentences.

3. The system of claim 1, wherein the confidence score for the transcript and each of the plurality of candidate sentences is determined based on a weighted sum of a word association score and a keyword score of each of the plurality of candidate sentences and the transcript.

4. The system of claim 3, wherein the processing hardware is further configured to execute the software code to:

determine the word association score using the trained word association ML model.

5. The system of claim 1, wherein the processing hardware is further configured to execute the software code to:

partition the phoneme stream into the plurality of words using a plurality of word boundaries obtained from the transcript.

6. The system of claim 1, wherein the system memory further stores a trained grapheme-to-phoneme (G2P) ML model, and wherein the processing hardware is further configured to execute the software code to:

generate the phoneme stream corresponding to the transcript using the trained G2P ML model.

7. The system of claim 1, wherein designating the plurality of candidate sentences uses a weighted combination of respective outputs of the trained common language prediction ML model and the trained domain-specific language prediction ML model.

8. The system of claim 1, wherein the system memory further stores a trained goal prediction ML model, and wherein the processing hardware is further configured to execute the software code to:

determine the at least one of the intent of the user or the context of the speech by the user using the trained goal prediction ML model.

9. The system of claim 1, wherein the system memory further stores a trained ranking ML model, and wherein the processing hardware is further configured to execute the software code to:

perform the ranking of the plurality of candidate sentences and the transcript using the trained ranking ML model.

10. A method for use by a system including a computing platform having processing hardware and a system memory storing a software code, a trained common language prediction machine learning (ML) model, a trained domain-specific language prediction ML model, and a trained word association ML model, the method comprising:

receiving, by the software code executed by the processing hardware, a transcript of speech by a user;

generating, by the software code executed by the processing hardware, a phoneme stream corresponding to the transcript;

partitioning, by the software code executed by the processing hardware, the phoneme stream into a plurality of words;

randomly generating, by the software code executed by the processing hardware and using the plurality of words partitioned from the phoneme stream, a plurality of word sequences of variable length;

identifying, by the software code executed by the processing hardware and using dynamic time warping (DTW) applied to the randomly generated word sequences of variable length, a candidate word pool;

designating, by the software code executed by the processing hardware and using the trained common language prediction ML model, the trained domain-specific language prediction ML model and the trained word association ML model to predict a disambiguation of the transcript and each of a plurality of different sequences of words included in the candidate word pool, a plurality of candidate sentences, wherein designating the plurality of candidate sentences further includes determining a confidence score for the transcript and each of the plurality of candidate sentences;

determining, by the software code executed by the processing hardware using at least one of an entity identified in the transcript or a history of the user, at least one of an intent of the user or a context of the speech by the user;

performing a ranking of the plurality of candidate sentences and the transcript, by the software code executed by the processing hardware, based on the at least one of the intent of the user or the context of the speech by the user; and identifying, by the software code executed by the processing hardware based on the ranking, one of the plurality of candidate sentences or the transcript as a best transcription of the speech by the user.

11. The method of claim 10, wherein the ranking of the plurality of candidate sentences and the transcript is further based on the confidence score for the transcript and each of the plurality of candidate sentences.

12. The method of claim 10, wherein the confidence score for the transcript and each of the plurality of candidate sentences plurality is determined based on a weighted sum of a word association score and a keyword score of each of the plurality of candidate sentences and the transcript.

13. The method of claim 12, further comprising:

determining the word association score using the trained word association ML model.

14. The method of claim 10, wherein partitioning the phoneme stream into the plurality of words using a plurality of word boundaries obtained from the transcript.

15. The method of claim 10, wherein the system memory further stores a trained grapheme-to-phoneme (G2P) ML model, and wherein the phoneme stream corresponding to the transcript is generated using the trained G2P ML model.

16. The method of claim 10, wherein designating the plurality of candidate sentences uses a weighted combination of respective outputs of the trained common language prediction ML model and the trained domain-specific language prediction ML model.

17. The method of claim 10, wherein the system memory further stores a trained goal prediction ML model, and wherein the at least one of the intent of the user or the context of the speech by the user is determined using the trained goal prediction ML model.

18. The method of claim 10, wherein the system memory further stores a trained ranking ML model, and wherein the ranking of the plurality of candidate sentences and the transcript is performed using the trained ranking ML model.

* * * * *